United States Patent [19]
Donnelly

[11] 3,774,996
[45] Nov. 27, 1973

[54] REARVIEW PERISCOPE ADJUSTMENT MEANS FOR VEHICLES

[75] Inventor: John F. Donnelly, Holland, Mich.

[73] Assignee: Donnelly Mirrors, Inc., Holland, Mich.

[22] Filed: Aug. 22, 1972

[21] Appl. No.: 282,705

Related U.S. Application Data
[63] Continuation of Ser. No. 167,730, July 30, 1971, abandoned.

[52] U.S. Cl............... 350/302, 248/480, 350/307, 350/299
[51] Int. Cl. ............................................. G02b 5/08
[58] Field of Search.................. 350/288, 299, 301, 350/302, 307; 248/480, 481, 295, 298

[56] References Cited
UNITED STATES PATENTS

| | | | |
|---|---|---|---|
| 3,058,395 | 10/1962 | Mattsson | 350/302 |
| 3,463,578 | 8/1969 | Smith | 350/302 |
| 2,168,003 | 8/1939 | Stone | 350/307 |
| 3,589,663 | 6/1971 | Vance | 248/480 |
| 3,488,026 | 1/1970 | Wallace et al. | 248/480 |
| 3,367,616 | 2/1968 | Bauschet et al. | 248/483 |

FOREIGN PATENTS OR APPLICATIONS

| | | | |
|---|---|---|---|
| 924,721 | 0/1963 | Great Britain | 350/302 |

Primary Examiner—David Schonberg
Assistant Examiner—Michael J. Tokar
Attorney—Peter P. Price et al.

[57] ABSTRACT

A rearview periscope system for vehicles including three mirrors, at least one of which is mounted within the vehicle. This mirror located within the vehicle has a novel mirror supporting and adjustment means which allows the adjustment of both the distance of said mirror from the other mirrors along the central sightline of the reflected mirrors, and the angular position of the plane of said mirror with respect to the planes of the other mirrors.

19 Claims, 10 Drawing Figures

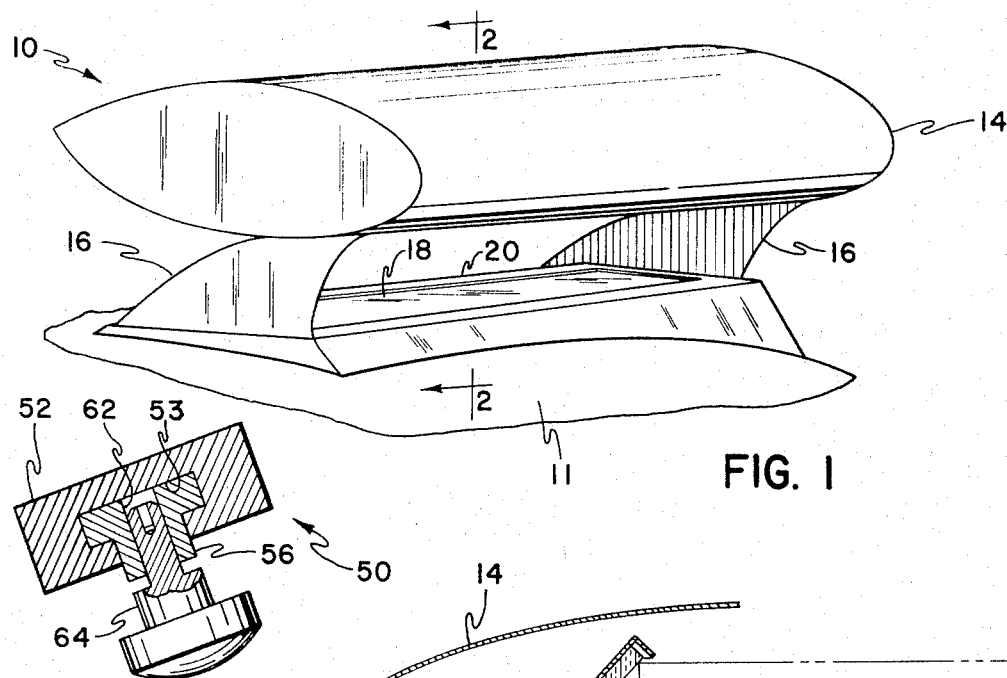
FIG. 1
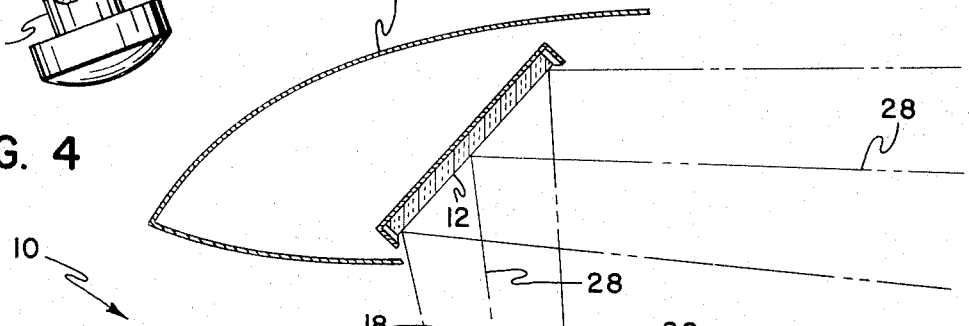
FIG. 4
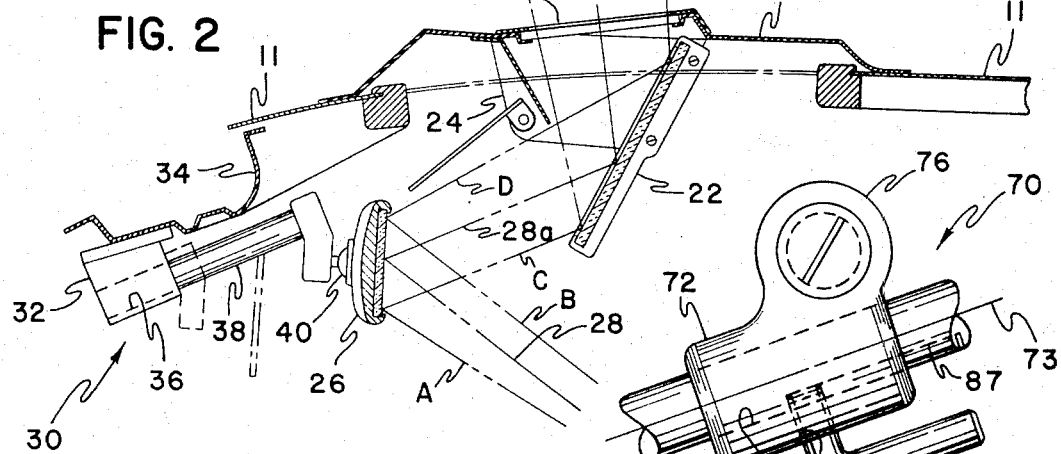
FIG. 2
FIG. 6

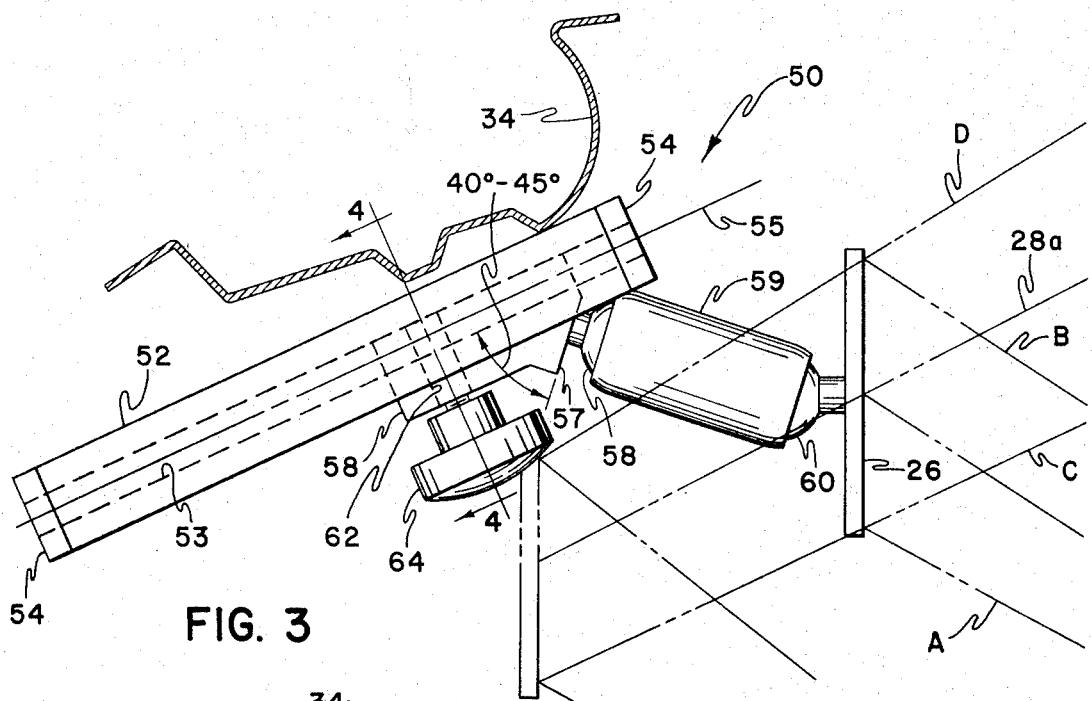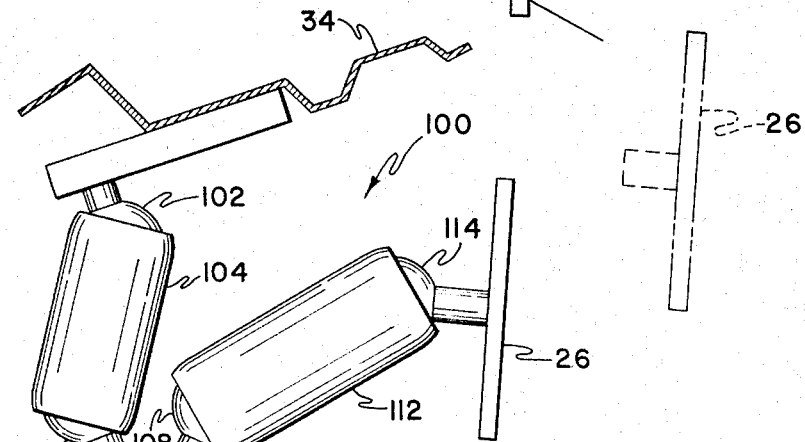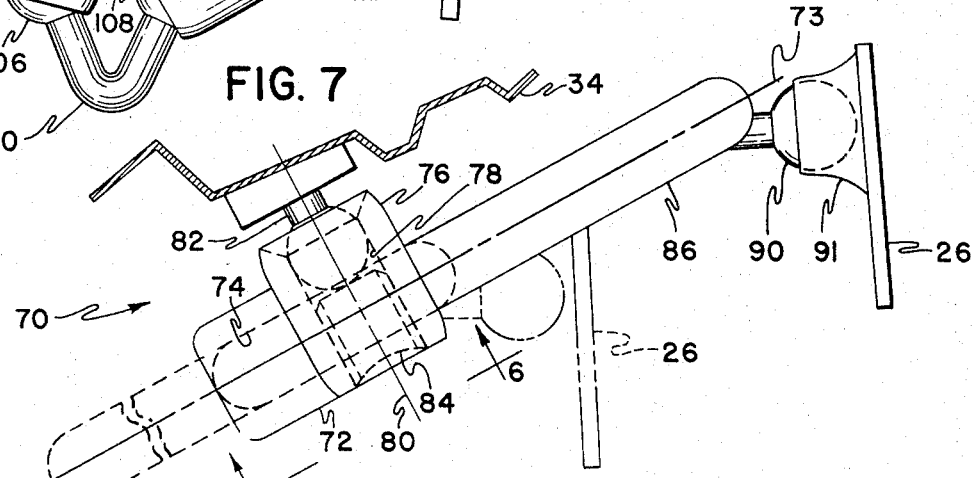

3,774,996

REARVIEW PERISCOPE ADJUSTMENT MEANS FOR VEHICLES

This application is a continuation of pending application Ser. No. 167,730, filed on July 30, 1971, now abandoned.

This invention relates to periscope systems for vehicles and, more particularly, to rearview periscope systems incorporating adjustment means for at least one mirror disposed on the interior of the vehicle.

BACKGROUND OF THE INVENTION

Rearview periscope systems for vehicles are well-known in the art. Such systems, utilizing at least three mirrors in combination, have been designed to increase the field of vision of the driver of a vehicle incorporating such a system, thereby making driving an easier and safer task. Typically, the prior systems utilized three mirrors arranged within the confines of a box which in turn was projected through the roof of the vehicle in order to reflect the light rays from the exterior of the vehicle to the interior. Although these arrangements did, in fact, increase the field of vision, they were all characterized by a common defect, that being the inflexibility of those systems. Typically, the viewing mirrors were positioned in a fixed position, near the roof of the vehicle. Thus, when the driver desired to use the mirror to view the traffic situation behind the vehicle, he did not get a full rear view unless he tilted his head or shifted his eyes so as to disturb his normal driving position which frequently resulted in taking his eyes completely off the roadway.

Similarly, the inflexibility of the prior systems produced other disadvantages. The most notable of these was the inability of these systems to accommodate drivers of different sizes whose eyes are located at different levels and distances from the mirrors. Thus, when a shorter person desired to use the fixed mirror systems, he had to pull himself up in the seat, thereby losing all concentration on his driving, or use some other means of support to raise his eye position. Similarly, a driver with long legs or short legs had to adjust himself to obtain full vision from the mirror system. Some of the later systems incorporated means by which the first mirror could be tilted in order to accommodate different size persons. However, even when the mirror was tilted, a person having an eye position located a greater distance than normal from the first mirror lost a substantial part of the field of vision possible with the mirror system, since the remaining mirrors in the system could not be adjusted. Further, a driver having an eye position located a shorter distance than normal from the first mirror would see the boundaries of the other unadjustable mirrors which was very disturbing to the driver. Consequently, the utility of these prior systems was severely reduced since they could accommodate only persons of a common size.

Accordingly, the need was readily apparent for a rearview periscope system which was convenient to use and which was flexible enough to accommodate nearly all the various sized adult persons who would be driving the vehicles incorporating the system. Responsive to this need, the primary objective of this present invention is to provide a rearview periscope system adjustment means which allows the accommodation of nearly every size of adult person who will conceivably utilize the vehicle incorporating the periscope system. Similarly, it is another object of the present invention to provide a rearview periscope system adjustment means which places the first or viewing mirror, into which the driver of the vehicle looks, in a position which is both very convenient and safe to use. It is yet another object of the present invention to provide a rearview periscope system adjustment means which is simple and easy to operate.

SUMMARY OF THE INVENTION

The novel and inventive features of the present invention may be accomplished by providing a rearview periscope adjustment means described as follows. The novel adjustment means is incorporated in a rearview periscope system comprising three mirrors, at least one (the first) of which is mounted within the interior of the vehicle. At least one mirror (the third) reflects the light rays from the rear of the vehicle through a cover glass into the interior of the vehicle by way of reflecting the same from a second mirror located between the first and third mirrors. In accordance with this invention, the first mirror is mounted with relation to the other two mirrors so as to provide a novel adjustability with relation thereto, the combination thereof providing the desired feature of accommodating all sizes of drivers while keeping the rearward field of vision nearly exactly the same for each driver. This is accomplished by using an adjustment means which is movable along the central sightline of the mirror system without the necessity of changing the angular position of the plane of the first mirror with respect to the second mirror, and also providing a means for angularly adjusting the first mirror with respect to the others. The adjustment means maintains the total optical path length from the driver's eyes to the third or exterior mirror within a specified distance range by moving only the first or viewing mirror along the sightline toward the second mirror. At the same time, the viewing mirror remains at a substantially constant angle above the horizontal planes including the eyes of various sized drivers. As a result, the field of vision for each sized driver remains substantially the same.

In the preferred embodiment, this adjustment is accomplished by providing a first mirror supporting means mounted at or near the top of the windshield. The supporting means comprises a support member having a receptacle formed therein to receive a corresponding sliding member with threaded means to secure the slide in the receptacle of the support member. On the end of the slide nearest the second mirror, is positioned a ball joint on which the first mirror is pivotally mounted. Therefore, to accommodate a driver whose eye position is lower and closer to the windshield, the securing means may be loosened permitting the slide, to be slid toward the dashboard of the vehicle in a direction away from the eyes of the driver. The axis of travel of the slide, as mentioned before, is parallel to the central sightline of the mirror system. Thus, in this example, although the first mirror is lowered sufficiently to allow the smaller person to conveniently view its surface, it has remained in exactly the same position with respect to the central sightline, and the angular position of the plane of its mirror surface has not changed with respect to the angular position of the plane of the second mirror surface. Further, as explained above, the total optical path length of the system, as well as the angular position of the first mirror above the horizontal plane including the driver's eyes, remain substantially the same for generally all sizes of drivers. Therefore, the field of vision as viewed in the first mirror remains substantially the same for all sized persons. The swivel ball joint is provided on the end of the slide in order to provide means for making minor corrections in the field of vision, i.e., to minimize the viewing of the frame of the second and third mirrors, etc.

These and other objects, advantages and features of the invention will become apparent from a study of the following description taken in conjunction with the drawings.

BRIEF DESCRIPTION OF THE DRAWINGS

FIG. 1 is a perspective view of the exterior of the roof section of a vehicle incorporating the rearview periscope system;

FIG. 2 is a cross-sectional view of the complete periscope system taken along line II—II of FIG. 1;

FIG. 3 is an elevational side view of the preferred embodiment of the supporting and adjustment means utilized in the present invention;

FIG. 4 is a fragmentary cross-sectional view of the preferred embodiment of the supporting and adjustment means taken along line IV—IV of FIG. 3;

FIG. 5 is an elevational side view of an alternative embodiment of the supporting and adjustment means;

FIG. 6 is a fragmentary bottom view of an alternative embodiment of the supporting and adjusting means taken along line VI—VI of FIG. 5;

FIG. 7 is an elevational side view of yet another alternative embodiment of the supporting and adjusting means;

DESCRIPTION OF THE PREFERRED EMBODIMENT

Figure 8:
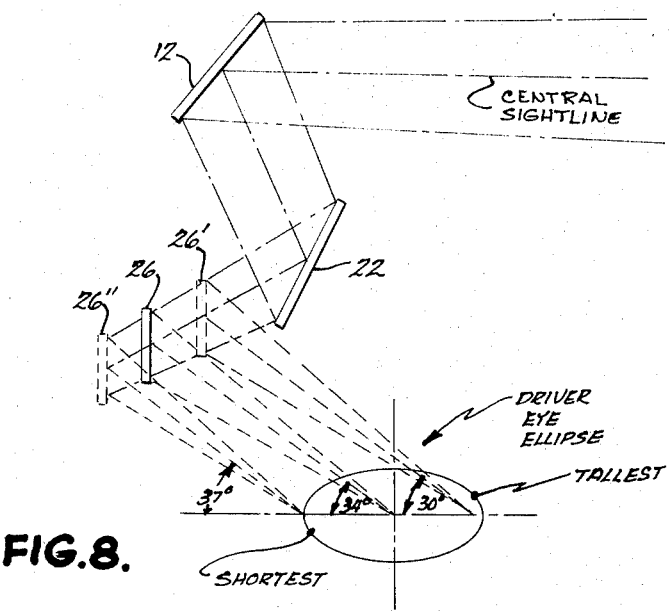
FIG. 8 is a schematic drawing of the range of adjustments allowed by the embodiments of the present invention.

In reference to the drawings generally, a rearview periscope system is shown generally at 10. The periscope system comprises a third or extra-vehicular mirror 12 fixedly mounted within an aerodynamically designed cowling 14 in the shape of a partial air foil. The cowling 14 is supported by struts 16 and is mounted on the roof of the vehicle 11, generally over the area in which the driver would sit. The third mirror 12 faces rearward and collects light rays from the rear of the vehicle which are traveling generally parallel to the roof of the vehicle and the ground over which it travels. The collected light rays are reflected generally vertically downwardly by the third mirror 12 through a transparent cover means 18 which is supported over an opening formed in the roof of the vehicle by a cover plate 20. The reflected rays strike a second mirror 22 which is mounted in a "breakaway" fashion (further described herein) on support brackets 24. The second mirror 22 in turn reflects the light rays downwardly at an angle to a first mirror 26. The first mirror 26 in turn reflects the light rays to the eye of the driver of the vehicle (not shown). The reflected light rays are slightly non-parallel and are seen to be reflected in a generally converging manner through the three mirror system towards the eye of the driver. The central sightline 28 thus follows the path of the central-most reflected light beam through the mirror system 10.

In accordance with this invention, I have provided in the above combination the concept of adjusting the first mirror 26 along the central sightline 28 of the system while maintaining the remaining two mirrors a constant distance from one another. Also, independently of such sightline adjustment, the first mirror can be adjusted angularly with respect to the other mirrors. This novel adjustment is accomplished by means of the supporting and adjustment means for the first mirror 26 shown generally at 30. The adjustment means 30 comprises a support member or base 32 mounted on a support stamping 34 which is in turn fixedly attached to the roof 11 in the vicinity of the interior of the top of the windshield (not shown). Received in a receptacle 36 in the base 32 is a slide 38 supporting a ball joint 40 on the end of the slide 38 nearest the second mirror 22 on which is swivelly mounted first mirror 26. Securing means (not shown in FIG. 2) are incorporated with base 32 and slide 38 to secure slide 38 at various positions. The receptacle 36 is formed within base 32 so as to have its longitudinal axis parallel to the central sightline 28a (between the first and second mirrors) of the mirror system. Thus it is apparent that the slide 38, and thus first mirror 26, may be slid toward and away from base 32 along sightline 28a, thereby keeping the first mirror 26 in exact alignment with the central sightline 28a of the entire periscope system without the actual physical adjustment of the first mirror 26 itself. Consequently, regardless of the position of the slide 38, the first mirror 36 will be in exact relative alignment with the second and third mirrors 22 and 12, respectively, thereby insuring that, upon proper adjustment, the field of vision of the driver, no matter what his physical size, will be substantially the same. Since the range of travel of the slide 38 approximately includes only 5 or 6 inches, it is apparent that the first mirror 26 will always be near the top of the windshield on the interior of the vehicle thereby insuring that the first mirror 26 will be conveniently located for all sizes of drivers. Therefore, in vehicles in which the driver sits on the left-hand side of the vehicle, the system is designed to allow the adjustment of the first mirror to be located at an angle within the range of between about 30°–37° above the horizontal position of the driver's eyes, as shown in FIG. 8, in the area above the upper right-hand quadrant of the steering wheel, thereby allowing the driver to view the rearward field of vision with only a slight movement of his eyes. Thus, he need not remove his eyes from the path of the vehicle for any extended period of time, thereby insuring his control of the vehicle and his ultimate safety at all times. The adjustment means provides substantially the same angular relationship of first mirror to horizontal plane including the driver's eyes for generally all sizes of drivers. As noted above, this is generally 30°–37° for all drivers.

To further facilitate the convenient adjustment of the first mirror 26, the adjustment means may include a plurality of check stops, or built-in adjustment positions, which will automatically be engaged as the slide 38 is moved towards or away from the second mirror 22. Thus, the securing means (not shown in FIG. 2) would automatically engage these check stops without the driver having to consciously tighten or engage the securing means at these positions.

Referring now more particularly to the exact embodiments of the adjustment means, the preferred embodiment is shown at 50 in FIG. 3. Such adjustment means comprises a support member or base 52 having a generally rectangular cross section as shown in FIG. 4. Formed centrally therein is a slot 53 having a T-shaped cross section corresponding to a T-shaped slide 56 slidably mounted therein. End caps 54 are mounted on the ends of the base 52 to prevent the slide 56 from sliding completely out of the T-shaped slot 53. Slide 56 has a surface 57 formed integrally therewith at an angle of approximately 40° to 45° with the longitudinal axis 55 of the slide 56. Lesser angles may also be used depending on the particular orientation desired for mirror 26. A ball joint 58 is mounted perpendicularly with surface 57. Ball joint 58 receives one end of a double ball joint receptacle or swivel spacing member 59 such that the opposite end of the receptacle 59 is left open to receive a second ball joint 60 mounted on the back of first mirror 26 such that the position of the first mirror 26 may be changed by swiveling either ball joint 58 or 60. Slide 56 also includes a threaded hole 62 which receives set screw with an enlarged head 64 such that by tightening or loosening the set screw, the slide 56 may be secured or loosened to allow movement from position to position.

Figure 10:
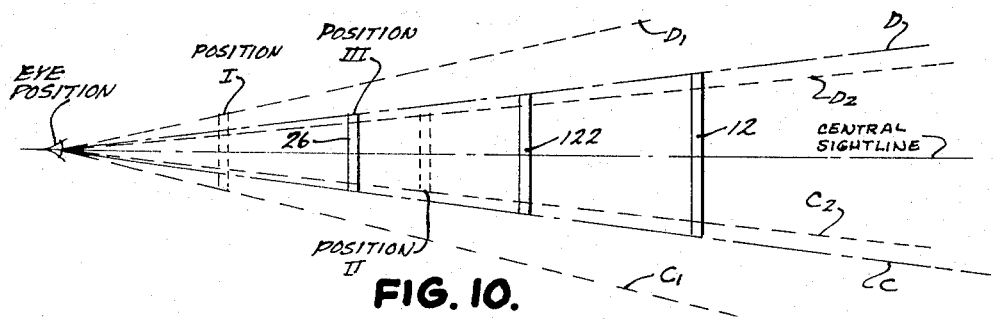
FIG. 10 is a schematic view of the mirror system aligned in a linear orientation for explanation purposes showing the boundaries of the fields of visions as the first mirror is moved along the central sightline between an eye position and the second mirror.

The operation of the adjustment means 50 incorporated within periscope system 10 will now be apparent. The support member or base 52 is mounted with its longitudinal axis 55 parallel to the central sightline 28a running between the first and second mirrors on support stamping 34 located in the vicinity of the top of the windshield in the area of the upper right quadrant of the vehicle steering wheel (not shown). To accomplish the first mirror adjustment, the vehicle driver positions himself in the driver's seat and glances slightly upward to sight the surface of the first mirror 26. In order to obtain optimum field of vision without viewing the boundaries of the mirrors, his line of sight is bounded generally by the light rays C and D, as shown in FIGS. 3 and 10. As shown in FIG. 10, where the mirror system is shown with the various mirrors arranged linearly along the central sightline to facilitate an understanding of the changes in the boundaries of the field of vision as the first mirror is adjusted in accordance with this invention, if the first mirror 26 is positioned too close to the driver's eyes, as represented by position I, the driver in viewing the mirror has a line of sight bounded generally by light rays $C_1$ and $D_1$. As a result, the driver will see the boundaries of the second and third mirrors when the first mirror is in position I. On the other hand, if the mirror is positioned at position II, the driver has a line of sight bounded generally by light rays $C_2$ and $D_2$ and as a result will have too a limited field of view. Thus, the full capacities of the second and third mirrors, 22 and 12 respectively, will not be utilized in position II. However, when properly positioned at position III, the line of sight will be bounded by the light rays C and D to give optimum field of view without annoyance of seeing the boundaries of both the second and third mirrors. It should be understood that mirror sizes for the present system are chosen to accommodate both tall and short persons. Mirror sizes must be larger to accommodate taller persons. Accordingly when the system is adjusted for shorter persons, the field of view remains substantially the same although the image of that field does not necessarily fill the entire first or viewing mirror. Thus, shorter persons may see a portion of the boundary of the second mirror. However, no more than this one mirror boundary will be seen by any person using the system since the second and third mirrors are kept a constant distance apart resulting in their full surfaces and capacities being utilized for all adjustments of the system.

Minor angular adjustments can be made by means of ball joints 58 and 60. This simple, one-handed adjustment is made possible since the longitudinal axis 55 of the base member 52, slot 53, and thus slide 56, are parallel to the central sightline 28a of the light rays being reflected between the first and second mirrors 26 and 22, respectively. Therefore, wherever slide 56 is positioned within slot 53, the first mirror 26 will be in exact alignment with the central sightline 28a, thereby obviating any major adjustments other than the movement of slide 56 to accommodate shorter or taller persons.

DESCRIPTION OF THE ALTERNATIVE EMBODIMENT FOR THE ADJUSTMENT MEANS

Referring to FIGS. 5 and 6, an alternative embodiment of the adjustment means is shown generally at 70. Mirror support means 70 comprises a generally cylindrical swivel support member 72 having a cylindrical hole 74 bored therethrough along longitudinal axis 73. Formed integrally with support member 72 is a generally cylindrical extension 76 having a cylindrical hole 78 bored therethrough along axis 80. Axis 80 is perpendicular to axis 73. The swivel support member 72 is swivelly mounted on support stamping 34 by means of a ball joint 82. A set screw 84 is threadably received in threaded hole 78 and may be tightened against ball joint 82 to adjust the amount of friction on the ball joint 82. A slidable rod 86 is received in cylindrical hole 74 and has a slot 87 (see FIG. 6) formed along the surface thereof. The rod 86 is secured in hole 74 by means of a set screw 88 threadably received in a threaded hole 89 bored perpendicularly to the axis 73 of hole 74 such that set screw 88 may be advanced into slot 87 to secure rod 86 in various positions. Mounted at the end of rod 86 closest to the second mirror 22, is a second ball joint 90 mounted to be substantially horizontal. Ball joint 90 is received in a receptacle 91 mounted on the back of first mirror 26 such that first mirror 26 may be swiveled for minor adjustments.

The method of adjusting means 70 to accommodate various sized drivers will now be apparent. First, the axis 73 of the hole 74, and thus rod 86, must be positioned to be parallel to the central sightline 28a between the first and second mirrors. This is accomplished by loosening set screw 84 positioning the rod 86 and swivel mounting 72 such that the axis 73 is parallel to the sightline 28a, and then tightening set screw 84 to retain the rod 86 and base 72 in the parallel position. Once this parallel adjustment has been made, set screw 84 need not be further adjusted unless it becomes loosened and allows the base 72 to swivel out of the parallel position. Major adjustments to accommodate various sized drivers may be made by loosening set screw 88 and allowing rod 86 to slide from position to position as shown in the phantom lines in FIG. 5. Thus, it is apparent that the periscope system may be adjusted to accommodate all sizes of vehicle drivers by incorporating the novel adjustment means 70.

FIG. 7 reveals yet another alternative embodiment of the novel first mirror adjustment means shown generally at 100. Adjustment means 100 is mounted on support stamping 34 by means of a ball joint 102 which is received at one end of a double ball joint receptacle or swivel spacing member 104. A double ball joint having second and third ball joints 106 and 108 joined by an interconnecting rod 110, generally in the shape of a V, interconnects double ball joint receptacle 104 with a second double ball joint receptacle 112. Ball joint 106 is received in the second end of receptacle 104 and ball joint 108 is received in one end of the double ball joint receptacle 112. The remaining end of receptacle 112 receives a ball joint 114 mounted on the back of first mirror 26. Thus, as is apparent from the phantom lines in FIG. 7, the combination ball joint which comprises the novel adjustment means 100 may be extended or retracted along an axis parallel to the central sightline 28a to accommodate shorter or taller vehicle drivers merely by movement of one or more of the swivel ball joints.

In summary then, utilization of any of the mirror supporting and adjusting means 30, 50, or 70 will allow the accommodation of 95 percent of the various sized individuals who will utilize the periscope system. Additionally, the use of supporting and adjusting means 100 will allow the accommodation of approximately 80 percent of the various sized individuals who will utilize the periscope system. As shown in FIG. 8, the periscope system, as made adjustable by any of the first mirror supporting and adjustment means 30, 50, or 70 is designed to accommodate all persons whose eye position falls within the driver eye ellipse shown therein. The ellipse represents approximately 95 percent of the eye positions of the average drivers in the population when they are sitting in the vehicle adjacent the periscope system. This ellipse generally includes most drivers since conventional and commonly used seats and seat adjustment mechanisms cause eye positions to fall within this area. Further, many person's eye positions will lie along or adjacent the horizontal plane through the center of the ellipse with the eye positions of taller and shorter persons varying on either side of that plane. Thus, to accommodate taller persons, as shown in FIG. 8, any of the first mirror-supporting and adjustment means may be adjusted to move first mirror 26 to the proper height, closer to mirror 22, i.e., to position 26'. The total optical path length, i.e., the total of the three distances from the driver's eyes to the first mirror 26, from the first mirror 26 to the second mirror 22, and from the second mirror 22 to the third mirror 12, remains substantially the same, i.e., within the same distance range, thus providing the same field of vision when the mirror is properly adjusted to accommodate the various sized drivers. The total optical path length actually varies slightly for various drivers but generally will be within a certain distance range depending on the overall system size, particular mirror sizes, etc. However, this range is generally small enough that the total optical path length can be considered substantially the same for most drivers. The adjustment means also allows the first mirror 26 to be within the range of between about 30° – 37° above the horizontal plane of the driver's eyes for all sizes of drivers. As with the total optical path length range, this angular range is dependent upon the overall system size, mirror sizes, etc., but is small enough to produce substantially the same head turn-up for substantially all drivers.

With any of the adjustment means except means 100, the major adjustment will be accomplished by loosening a single set screw and sliding the first mirror towards the second mirror along an axis parallel to the central sightline 28, as indicated by the dotted line in FIG. 8, thereby keeping the first mirror in exact alignment with the second and third mirrors in the periscope system. The same adjustment is accomplished in adjustment means 100 by simply moving the first mirror 26 towards the second mirror 22. Adjustments can be made also to the first mirror 26 by any of the four ball joints after the first mirror is moved to its approximate position.

Although any of the first mirror-supporting and adjustment means 30, 50, or 70 will accommodate 95 percent of the average population it will be apparent that the first mirror is always in a position for conveniently checking the traffic situation to the rear of the vehicle, merely by shifting the eyes slightly upward. Therefore, although the system is extremely flexible in accommodating the majority of various sized drivers, it may be conveniently used in any position.

It will be understood that the unique adjustment capabilities of the present system result from adjustment of the first or viewing mirror along the central sightline between the first and second mirrors while maintaining the second and third mirrors a constant distance from one another. Since the eye position varies for each different driver using the periscope system, movement of the first mirror alone in the manner described above thereby adjusts the optical path lengths between the eye position and the first mirror and the first mirror and the second mirror, as described in connection with FIGS. 8 and 10, while maintaining the total distance between the eye position and the second mirror substantially the same. Thus, the total optical path length from the eye position through all three mirrors remains substantially the same for generally all drivers. Consequently, the same rearward field of vision is maintained for generally all drivers. The system thus avoids all movement or adjustment between the second and third mirrors which would increase or reduce the field of vision visible through the system. Additionally, adjustment of the first mirror positions the first mirror at a relatively constant angle above eye level for generally all drivers, i.e., within the range of approximately 30° – 37° above eye level in the preferred embodiment.

Figure 9:
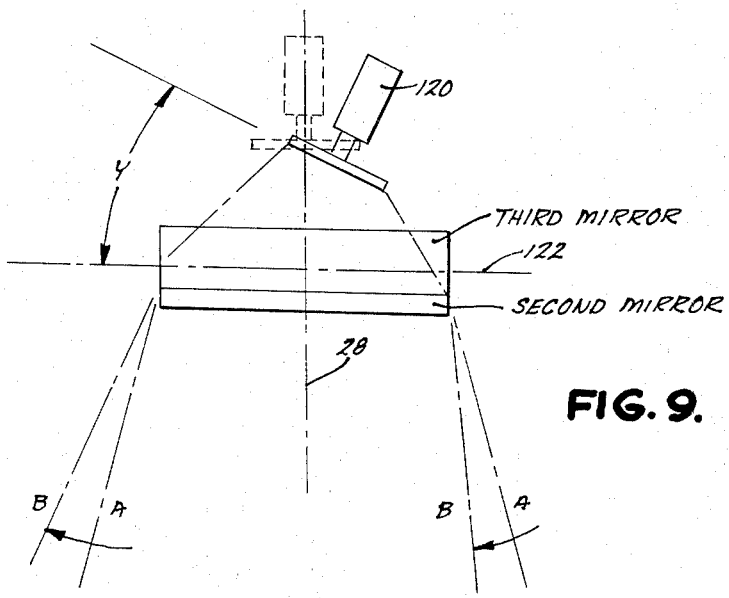
FIG. 9 is a schematic top view of the periscope system showing the adjustment means shifted from the central sightline to rotate the rearward field of vision.

The novel arrangement of the rearview periscope system as a whole may be slightly varied in order to rotate the rearview field of vision from directly behind the vehicle to a field including an area to the left rear of the vehicle. The varied novel arrangement shown in FIG. 9 is accomplished by positioning the first mirror supporting and adjustment means on the right side of the central sightline 28 instead of directly astride the central sightline 28. That is, considering the central sightline 28 to also be the width-wise center line of the periscope system as a whole, the first mirror supporting and adjustment means 120 need be merely positioned slightly to the right of that center line 28 in order to increase the field of vision toward the left of that same center line. Thus, by shifting the first mirror supporting and adjustment means 120 to the right of center line 28 in FIG. 9, the field of vision is shifted from the area between lines A—A to the area between lines B—B. Consequently, when the first mirror supporting and adjustment means 120 is so positioned to the right of that center line 28, the surface of the first mirror will be at a slight longitudinal angle Y with the second mirror surface 122. Consequently, more light rays entering from the left side of the vehicle will strike the surface of the first mirror 26 which has been positioned to the right of the center line 28 thereby enabling the driver to view a greater area to the left of the vehicle.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. In a three mirror periscopic system for motor vehicles comprising a first mirror to be viewed by the driver of said vehicle; a third mirror exposed to light rays from the rear of the vehicle; and a second mirror located between said first and third mirrors, all of said mirrors having a common central sightline whereby light rays from behind said vehicle are projected on said third mirror, reflected from said third mirror to said second mirror and then reflected from said second mirror to said first mirror for viewing by the driver of said vehicle; the improvement comprising supporting and adjustment means for adjusting only the position of said first mirror along said sightline away from and toward said second mirror; and including means for supporting said second mirror a constant distance from said third mirror; said system allowing adjustment to provide substantially the same field of view therethrough for all drivers using said system.

2. The system of claim 1 in which means is also provided for adjusting the angular position of the plane of said first mirror with respect to the planes of said other mirrors.

3. The periscopic system for vehicles as described in claim 1 in which the mirrors are progressively larger from the first mirror, to the second mirror, to the third mirror whereby the side boundaries for the field of vision of the driver from the driver's eyes are diverging planes, said central sightline included within a focal plane extending perpendicularly between said diverging planes, said first mirror being adjustable along said focal plane and angularly with respect to the planes of the other mirrors so as to be adjustable for locating the side boundaries of said first mirror substantially on said planes.

4. The system of claim 3 in which means is also provided for adjusting the angular position of the plane of said first mirror with respect to the planes of said other mirrors.

5. A periscope system for vehicles as described in claim 1 wherein said first mirror-supporting and adjustment means comprises a support member attached to said vehicle having a receptacle formed to receive a sliding member, said sliding member supporting said first mirror such that said first mirror may be slid towards and away from said second mirror along said sightline without changing the angular position of the plane of said first mirror with respect to said second mirror.

6. A periscope system for vehicles as described in claim 1 wherein said first mirror supporting and adjusting means comprises a support member attached to said vehicle having a slot formed centrally therein, a slide corresponding to the cross-sectional shape of said slot, means to secure said slide in said slot, and means mounted on said slide adapted to receive said first mirror.

7. A periscope system for vehicles as described in claim 6 wherein said means adapted to receive said first mirror are mounted on said slide at an angle with respect to the direction of travel of said slide.

8. A periscope system for vehicles as described in claim 7 wherein said means adapted to receive said first mirror includes a ball joint and swivel spacing member with a receptacle which receives a ball joint mounted on said first mirror.

9. A periscope system for vehicles as described in claim 6 wherein said means to secure said slide in said slot includes a hole bored in said slide and a set screw threadably received in said hole.

10. A periscope system for vehicles as described in claim 9 wherein said set screw has an enlarged head which facilitates the tightening and loosening of said set screw.

11. A periscope system for vehicles as described in claim 6 wherein said support member has capped ends such that said slide is prevented from sliding out of said slot.

12. A periscope system for vehicles as described in claim 6 wherein said slot and said slide have matching T-shaped cross sections.

13. A periscope system for vehicles as described in claim 1 wherein said first mirror supporting means conprises a ball joint mounted on said vehicle; a swivel support member mounted on said ball joint and adjusted by means of a set screw threadably mounted in a hole bored in a cylindrical extension in said member adapted to receive said ball joint, said member including a second hole bored therethrough whose axis is perpendicular to the hole bored in said cylindrical extension, and a third hole bored to intersect said second hole, said third hole having an axis perpendicular to said second hole; a rod slidably mounted in said second hole having means mounted thereon which receive said first mirror; and a set screw threadably received in said third hole such that said screw engages said rod when said rod is slidably received in said second hole.

14. A periscope system for vehicles as described in claim 13 wherein said means which receive said first mirror is a ball joint mounted on said rod at an angle with respect to the sliding direction of travel of said rod.

15. A periscope system for vehicles as described in claim 14 wherein a slot is cut lengthwise along at least a section of said rod such that said set screw engages said rod within said slot.

16. A periscope system for vehicles as described in claim 15 wherein said set screw has a handle formed at a right angle to the axis of the threads cut in said screw.

17. A periscope system for vehicles as described in claim 1 wherein said first mirror supporting means comprises a base attached to said vehicle, said base having a first ball joint mounted thereon; a swivel spacing member mounted on said first ball joint having receptacles for two ball joints, a double ball joint having second and third ball joints joined by an interconnecting rod; and a second swivel spacing member having receptacles for two ball joints mounted on said third ball joint such that a first mirror having a ball joint mounted thereon may be received in the second of said two receptacles.

18. A periscope system for vehicles as described in claim 17 wherein said interconnecting rod is formed in the shape of a V.

19. In a three mirror periscopic system for motor vehicles comprising a first mirror to be viewed by the driver of said vehicle; a third mirror exposed to light rays from the rear of the vehicle; and a second mirror located between said first and third mirrors, said second and third mirrors having a common central sightline whereby light rays from behind said vehicle are projected on said third mirror, reflected from said third mirror to said second mirror and then reflected from said second mirror to said first mirror for viewing by the driver of said vehicle; the improvement comprising supporting and adjustment means for adjusting the position of said first mirror along said sightline away from and toward said second mirror; said first mirror-supporting and adjustment means, including said first mirror, displaced to the side of said central sightline of said second and third mirrors such that the angle defining the field of vision is rotated, thereby including a greater field of vision on the side of said central sightline opposite the direction of displacement of said improved first mirror supporting and adjustment means.

* * * * *